C. G. KESLER.
COASTER BRAKE.
APPLICATION FILED OCT. 29, 1917.
1,299,735.
Patented Apr. 8, 1919.
2 SHEETS—SHEET 1.
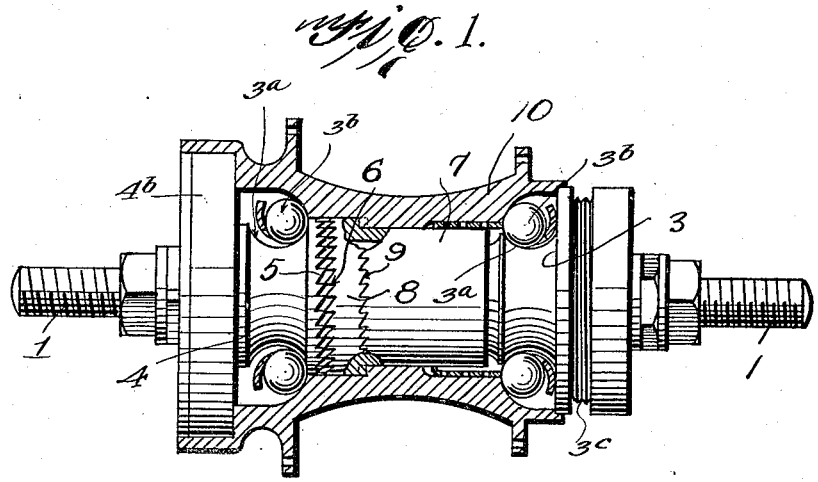
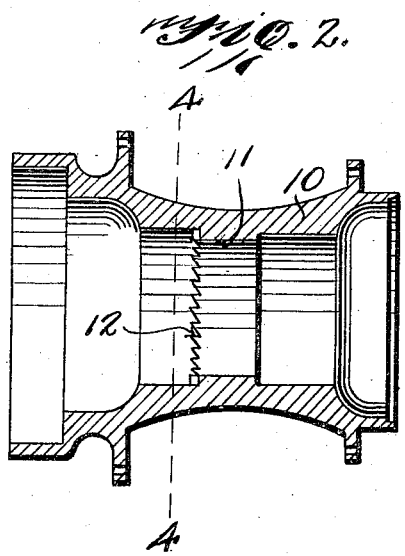
Inventor
C. G. Kesler C. G. KESLER.
COASTER BRAKE.
APPLICATION FILED OCT. 29, 1917.
1,299,735.
Patented Apr. 8, 1919.
2 SHEETS—SHEET 2.
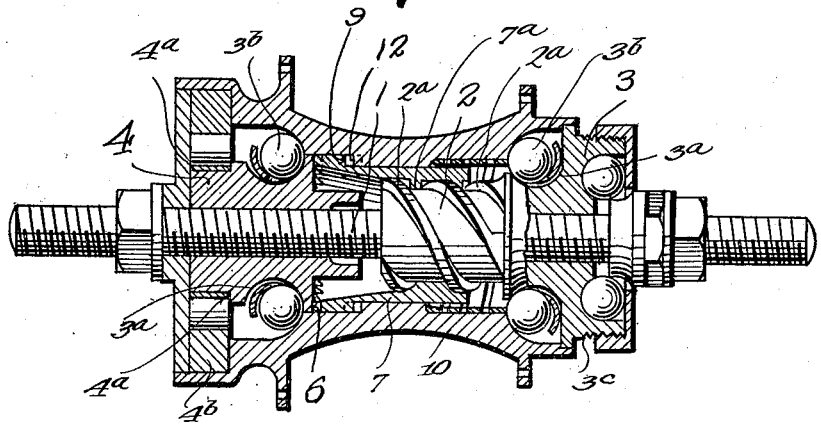
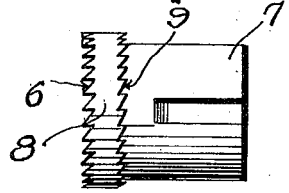
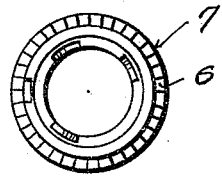
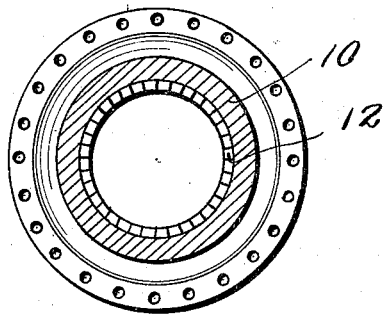
Inventor
C. G. Kesler
By E. E. Trooman & Co,
his Attorneys

UNITED STATES PATENT OFFICE.

CHARLES G. KESLER, OF LIMA, OHIO.

COASTER-BRAKE.

1,299,735.  Specification of Letters Patent.  Patented Apr. 8, 1919.

Application filed October 29, 1917. Serial No. 199,117.

*To all whom it may concern:*

Be it known that I, CHARLES G. KESLER, a citizen of the United States of America, residing at Lima, in the county of Allen and State of Ohio, have invented certain new and useful Improvements in Coaster-Brakes, of which the following is a specification, reference being had therein to the accompanying drawing.

This invention relates to coaster brakes and has for its object the production of a simple and efficient coaster brake wherein the outer casing of the brake is provided with a suitable ratchet for preventing lost motion of the driving clutch.

Another object of this invention is the production of a simple and efficient means for preventing the slipping of the brake while the clutch is being driven for the purpose of propelling the wheel supporting the coaster brake.

With these and other objects in view this invention consists of certain novel constructions, combinations and arrangements of parts as will be hereinafter fully described and claimed.

In the drawings:

Figure 1 is a longitudinal section through the clutch shell or casing showing the coaster brake in side elevation.

Fig. 2 is a longitudinal section through the shell or casing removed from the brake.

Fig. 3 is a longitudinal sectional view through the coaster brake device showing the casing mounted thereon.

Fig. 4 is a section taken on line 4—4 of Fig. 2.

Fig. 5 is a side elevation of the double clutch sleeve.

Fig. 6 is an end view of the structure shown in Fig. 5.

Referring to the drawings by numerals, 1 designates the axle carrying the spiral throwing spool 2 (Fig. 3).

The spiral throwing spool or clutch 2 is provided with a number of threads $2^a$, contiguous to its inner end, and has formed in its outer end 3 a ball race-way $3^a$, in which ball-bearings $3^b$ are positioned to rotate against the shell 10.

The bearing 4 is threaded upon the shaft 1, and this bearing 4 is provided with a race-way $3^a$ in which the ball-bearings $3^b$ are positioned (Fig. 3).

The spiral throwing clutch 2 is adapted to receive at $3^c$, a sprocket, for a sprocket chain, not shown as forming any part of this invention.

The threads near the inner end of the spool 2 fit inside of the sliding or driving clutch 7; this driving clutch 7 is provided with a collar 8, integral therewith, and on one end of collar 8 are clutch teeth 6, and on the other end or edge are the clutch teeth 9 clearly shown in Fig. 5.

The bearing 4 is provided with clutch or ratchet teeth 5, and this bearing 4 is the "braking-clutch." The ratchet teeth 5 on the braking bearing 4 are adapted to mesh with teeth 6 on the driving clutch 7.

When the wheel, equipped with my improved device, is propelled, the spiral throwing spool 2, to which the usual sprocket may be attached at $3^c$, as stated, pulls the driving clutch to the right, since the integral lug $7^a$ (Fig. 3) engages the threads $2^a$, and the ratchet teeth 9 are caused to mesh with a row of integral ratchet teeth 12 on the annular enlarged portion 11 (Fig. 2), thereby preventing the driving clutch slipping in the hub shell 10. This simple and just-specifically described mechanism includes my improvement in coaster-brakes.

In operation, when the spiral throwing spool 2 is rotated the threads $2^a$ act on the lug $7^a$ forcing the clutch 7 to the right, the ratchet teeth 9 of the collar 8 of the clutch 7 come in contact with the ratchet teeth 12 of the shell 10, thereby making it impossible for the clutch 7 to slip further in the shell. When the wheel, of which the shell 10 is a part, discontinues to rotate or be driven, the stopping of the shell 10 will cause spool 2 to rotate in the opposite direction, which will push the sliding or driving clutch or sleeve 7 in the opposite direction and the teeth 6 will come in contact with the ratchet teeth 5 on the brake bearing 4. When the sliding clutch 7 is reversed (or runs backward) the ratchet teeth 6 on the clutch 7, meshes with the ratchet teeth 5 on bearing 4; this extends the brake shoes against shell 10, thus causing the braking action.

The braking shoes and braking clutch are held stationary by a lever that is fastened to the frame of the vehicle, and which is not shown in the drawing as I make no claim to the structure as a part of the present invention.

What is claimed is:

In a coaster brake, a drive axle, a throwing clutch carried by said axle, a driving clutch surrounding said throwing clutch, cooperating means upon said throwing and driving clutches whereby said driving clutch will be moved predetermined distances longitudinally of the axle when the throwing clutch rotates, a double clutch face on said driving clutch, a bearing, a clutch face on said bearing, adapted to be engaged by one of the clutch faces on said driving clutch when the latter moves to its limit in one direction, a shell inclosing said clutches and braking mechanism, an annular shoulder formed integral with the shell upon the interior thereof, and teeth on said shoulder adapted to be engaged by the other of said driving clutch faces when the driving clutch moves to its limit in the opposite direction.

In testimony whereof I hereunto affix my signature.

CHARLES G. KESLER.

Copies of this patent may be obtained for five cents each, by addressing the "Commissioner of Patents, Washington, D. C."